US010872486B2

(12) United States Patent
Soni et al.

(10) Patent No.: US 10,872,486 B2
(45) Date of Patent: Dec. 22, 2020

(54) ENRICHED POLLING USER EXPERIENCE (71) Applicant: MICROSOFT TECHNOLOGY LICENSING, LLC, Redmond, WA (US)

(72) Inventors: Shahil Soni, Redmond, WA (US); Manjot Singh Pal, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 818 days.

(21) Appl. No.: 15/338,595

(22) Filed: Oct. 31, 2016

(65) Prior Publication Data

US 2018/0122172 A1 May 3, 2018

(51) Int. Cl.
*G07C 13/00* (2006.01)
*G06F 16/335* (2019.01)
*G06Q 30/02* (2012.01)
*G06Q 10/10* (2012.01)

(52) U.S. Cl.
CPC .......... *G07C 13/00* (2013.01); *G06F 16/335* (2019.01); *G06Q 10/1093* (2013.01); *G06Q 30/0201* (2013.01); *G06Q 2230/00* (2013.01)

(58) Field of Classification Search
None
See application file for complete search history.

(56) References Cited

U.S. PATENT DOCUMENTS

| 6,457,045 | B1 | 9/2002 | Hanson et al. |
| 8,100,327 | B2 | 1/2012 | Preisman |
| 8,260,852 | B1 | 9/2012 | Cselle |
| 8,693,494 | B2 | 4/2014 | Fiatal |
| 9,262,882 | B2 | 2/2016 | Judd et al. |
| 2005/0273804 | A1 | 12/2005 | Preisman |
| 2007/0192166 | A1* | 8/2007 | Van Luchene ......... G06Q 30/02 705/14.54 |
| 2007/0226628 | A1 | 9/2007 | Schlack |

(Continued)

OTHER PUBLICATIONS

Ferraz et al., "A Collaborative TV-Internet Application Model to Enrich TV Viewing Experience in a Pervasive Way," 6th IEEE Workshop on Pervasive Collaboration and Social Networking, IEEE, all pages. (Year: 2015).*

(Continued)

*Primary Examiner* — Jacob C. Coppola
(74) *Attorney, Agent, or Firm* — Michael Best & Friedrich LLP (57) ABSTRACT

Enriched polling user experiences are provided. In some examples, a local and/or remote search may be performed based on a top choice in an ongoing poll. The search may be performed when a threshold such as predefined duration, a predefined number of votes, and/or a percentage of received votes over a polled population. Search results may be used to enrich the user experience displaying the poll with static or interactive items such as images, graphics, textual data, links to resources, etc. If the top choice changes at some point during the poll, new search may be performed and the enriching elements revised based on the new top choice. Types and numbers of the enriching elements to be displayed may be selected based on a type of the poll or a vote distribution in the poll.

20 Claims, 8 Drawing Sheets

(56) References Cited

U.S. PATENT DOCUMENTS

| | | | |
|---|---|---|---|
| 2008/0026830 A1* | 1/2008 | Laut | G06Q 30/00 463/25 |
| 2008/0059308 A1* | 3/2008 | Gerken | G06Q 30/02 705/14.44 |
| 2008/0298386 A1* | 12/2008 | Fiatal | G06Q 30/02 370/449 |
| 2009/0063991 A1* | 3/2009 | Baron | G06Q 10/10 715/751 |
| 2009/0106080 A1* | 4/2009 | Carrier | G06Q 10/00 705/7.32 |
| 2009/0327268 A1* | 12/2009 | Denney | G06F 16/9535 |
| 2011/0004517 A1 | 1/2011 | Soto et al. | |
| 2011/0173214 A1* | 7/2011 | Karim | G06F 16/489 707/754 |
| 2011/0225040 A1* | 9/2011 | Yerli | G06Q 30/02 705/14.49 |
| 2012/0011006 A1* | 1/2012 | Schultz | G06Q 10/10 705/14.73 |
| 2012/0143914 A1* | 6/2012 | Lang | G07C 13/00 707/779 |
| 2012/0144416 A1* | 6/2012 | Wetzer | H04N 21/25816 725/14 |
| 2012/0197651 A1* | 8/2012 | Robinson | G06Q 30/02 705/1.1 |
| 2012/0197883 A1* | 8/2012 | Robinson | G06Q 30/0278 707/733 |
| 2012/0226743 A1* | 9/2012 | Smargon | G06Q 20/06 709/203 |
| 2012/0253942 A1* | 10/2012 | Garfinkle | G06Q 30/0269 705/14.66 |
| 2012/0317046 A1* | 12/2012 | Myslinski | G06Q 10/10 705/329 |
| 2013/0097144 A1* | 4/2013 | Siamwalla | G06Q 10/10 707/706 |
| 2013/0297402 A1* | 11/2013 | Chen | G06Q 30/02 705/14.39 |
| 2014/0081717 A1* | 3/2014 | Lu | G07C 13/00 705/12 |
| 2014/0195344 A1* | 7/2014 | Chand | G06Q 30/0261 705/14.52 |
| 2014/0257931 A1* | 9/2014 | Rinzler | G06Q 30/0203 705/7.32 |
| 2015/0058238 A1 | 2/2015 | Milley et al. | |
| 2015/0161632 A1* | 6/2015 | Humay | G06Q 30/0203 705/7.32 |
| 2015/0248651 A1* | 9/2015 | Akutagawa | G06Q 10/1095 705/7.19 |
| 2015/0331550 A1 | 11/2015 | Wang et al. | |
| 2015/0356468 A1 | 12/2015 | Cummins | |
| 2016/0036737 A1 | 2/2016 | Atamel et al. | |
| 2016/0048274 A1* | 2/2016 | Rosenberg | G06F 3/04842 715/753 |
| 2017/0139888 A1* | 5/2017 | Ramlet | G06F 3/0482 |
| 2017/0270547 A1* | 9/2017 | Poltz | G06Q 30/0205 |
| 2017/0351653 A1* | 12/2017 | Ramlet | G06F 17/277 |
| 2017/0352048 A1* | 12/2017 | Richardson | G06Q 30/02 |
| 2017/0359281 A1* | 12/2017 | Yip | H04L 51/046 |
| 2018/0033033 A1* | 2/2018 | Cummins | G06Q 30/0203 |
| 2018/0096369 A1* | 4/2018 | Kayton | G06Q 30/0203 |

OTHER PUBLICATIONS

"Create and send a voting poll in an email message—Outlook", Retrieved on: Aug. 31, 2016 Available at: https://support.office.com/en-us/article/Create-and-send-a-voting-poll-in-an-email-message-32b34320-a8c8-4b49-8f2d-9609188cd396.

"Create or respond to a Google+ poll—Google+ Help", Retrieved on: Aug. 31, 2016 Available at: https://support.google.com/plus/answer/6089358?hl=en.

* cited by examiner

ENRICHED POLLING USER EXPERIENCE

BACKGROUND

Polling is an increasingly common feature of many cloud based applications and services. In a connected environment, people share their views and are interested in others' views on a wide range of items in professional and personal lives. For example, determining a meeting time and location can be done through polling of the attendees, vacation destinations may be determined based on polling of a group (e.g., friends, a social group), and so on. While polling is a helpful feature, conventional polling services are static, that is, users may see the polled item, a list of participants, and polling results. The static nature leaves users with a limited user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enriched polling user experiences. In some examples, an initiation of a poll may be detected. Upon detecting a first polling threshold being reached, a search query may be submitted based on a current top choice in the poll. The threshold may be a time duration, a number of votes, or a percentage of votes over an entire polled population. upon receiving results of the search query, a user experience displaying the poll may be enriched with data derived from the received results of the search query.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, embodiments are directed to enriched polling user experiences. In some examples, a local and/or remote search may be performed based on a top choice in an ongoing poll. The search may be performed when a threshold such as predefined duration, a predefined number of votes, and/or a percentage of received votes over a polled population. Search results may be used to enrich the user experience displaying the poll with static or interactive items such as images, graphics, textual data, links to resources, etc. If the top choice changes at some point during the poll, new search may be performed and the enriching elements revised based on the new top choice. Types and numbers of the enriching elements to be displayed may be selected based on a type of the poll or a vote distribution in the poll.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing enriched polling user experience. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
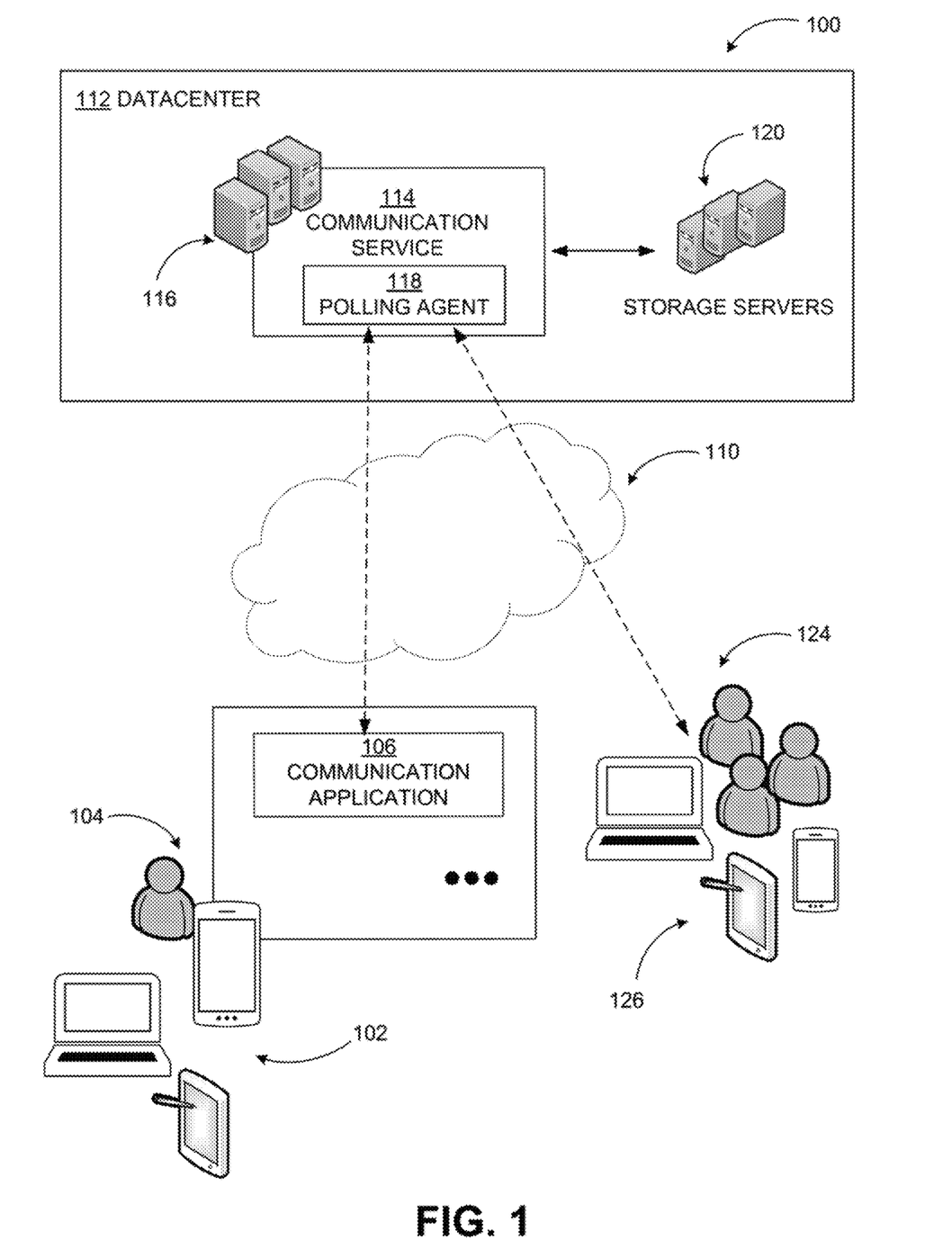
FIG. 1 includes an example network environment where a system to provide enriched polling user experience may be implemented.

FIG. 1 includes an example network environment where a system to provide enriched polling user experience may be implemented.

As illustrated in diagram 100, an example system may include a datacenter 112 hosting a cloud-based communication service 114 configured to provide calendar management and meeting scheduling services that may be accessed across multiple devices and users. The datacenter 112 may include one or more processing servers 116 configured to execute the communication service 114, among other components. In some embodiments, at least one of the processing servers 116 may be operable to manage the communication service 114, where data from devices (such as devices 102 and 126) may be stored at storage servers 120 (or associated data stores). As described herein, the communication service 114 may be implemented as software, hardware, or combinations thereof.

In some embodiments, the communication service 114 may be configured to interoperate with various applications to provide meeting management and calendar maintenance. For example, as illustrated in the diagram 100, a user 104 may execute a thin (e.g., a web browser) or a thick (e.g., a locally installed client application) version of a communication application 106 through the device 102 with which the communication service 114 may be configured to integrate and interoperate with over one or more networks, such as network 110. The communication application 106 may be an application hosted by the communication service, such as a communication client, for example. The device 102 may include a desktop computer, a laptop computer, a tablet computer, a vehicle mount computer, a smart phone, or a wearable computing device, among other similar devices. A communication interface may facilitate communication between the communication service 114 and the communication application 106 over the network 110.

In an example embodiment, the communication service 114 may include a polling agent 118 configured to perform polls among subscribers of the communication service 114. The polling information may be stored remotely at the communication service 114 within the storage servers 120, for example. In other examples, polling information may be stored at individual servers responsible for groups of users. The polling agent 118 may perform a local and/or remote search based on a top choice in an ongoing poll. The search may be performed when a threshold such as predefined duration, a predefined number of votes, and/or a percentage of received votes over a polled population. Search results may be used to enrich the user experience displaying the poll with static or interactive items such as images, graphics, textual data, links to resources, etc. If the top choice changes at some point during the poll, new search may be performed and the enriching elements revised based on the new top choice. Types and numbers of the enriching elements to be displayed may be selected based on a type of the poll or a vote distribution in the poll.

A system according to embodiments allows enriched polling user experience by augmenting a display of poll results with information associated with a current top choice of the poll. By determining useful information associated with the top choice and displaying the information in conjunction with the poll results, increased efficiency, reduced local and cloud computing resource usage, reduced bandwidth usage, and increased security and collaboration may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users participating in polls of various kinds.

Figure 2:
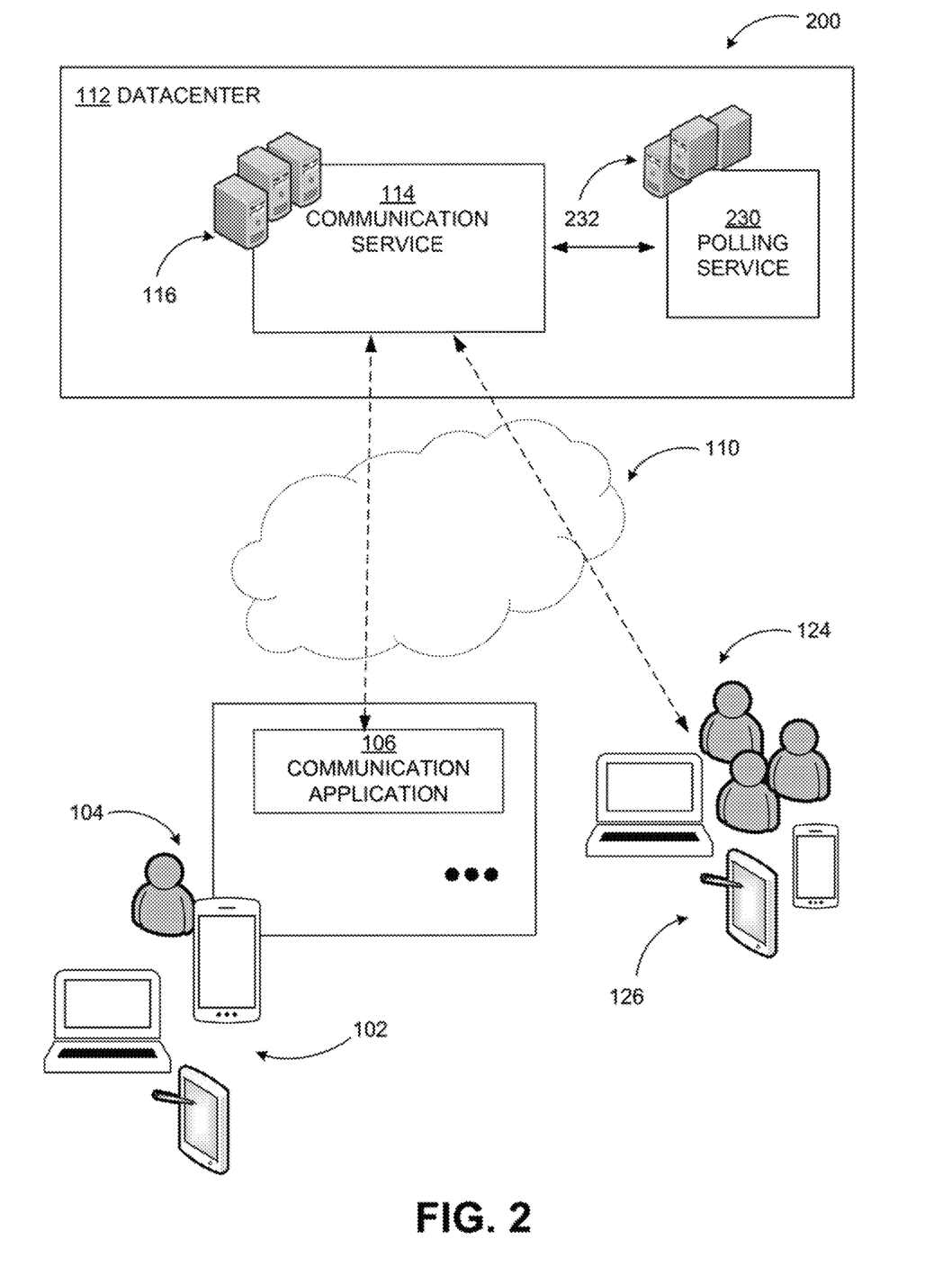
FIG. 2 illustrates another example network environment where a system to provide enriched polling user experience may be implemented.

FIG. 2 illustrates another example network environment where a system to provide enriched polling user experience may be implemented.

Diagram 200 shows a different configuration for providing enriched polling user experiences. Elements of diagram 200 numbered similarly to the elements of diagram 100 may have similar attributes and perform similar actions as described in conjunction with FIG. 1. In the example configuration of diagram 200, the communication service 114 may interact with a polling service 230 executed on one or more servers 232. Thus, upon receiving a request for conducting a poll from a subscriber of the communication service 114 such as user 104, the polling service 230 may conduct the poll and provide information to enrich the polling user experience as described above.

In some examples, the polling service 230 may undertake the actions associated with the poll and provide data to the communication service 114 to display poll results as the poll is ongoing. A user experience for displaying the poll results may be defined and provided by the communication service 114. In other examples, the polling service 230 may define and manage a user experience for displaying the poll results (along with enriching information associated with a current top choice) and provide the user experience to the communication service 114 to be embedded into a communication user experience displayed to the users.

The polling service 230 may perform the search(es) through an integrate search engine. The polling service 230 may also submit search queries to an external search service and receive the results to analyze and derive enriching information associated with the top choice.

Figure 3:
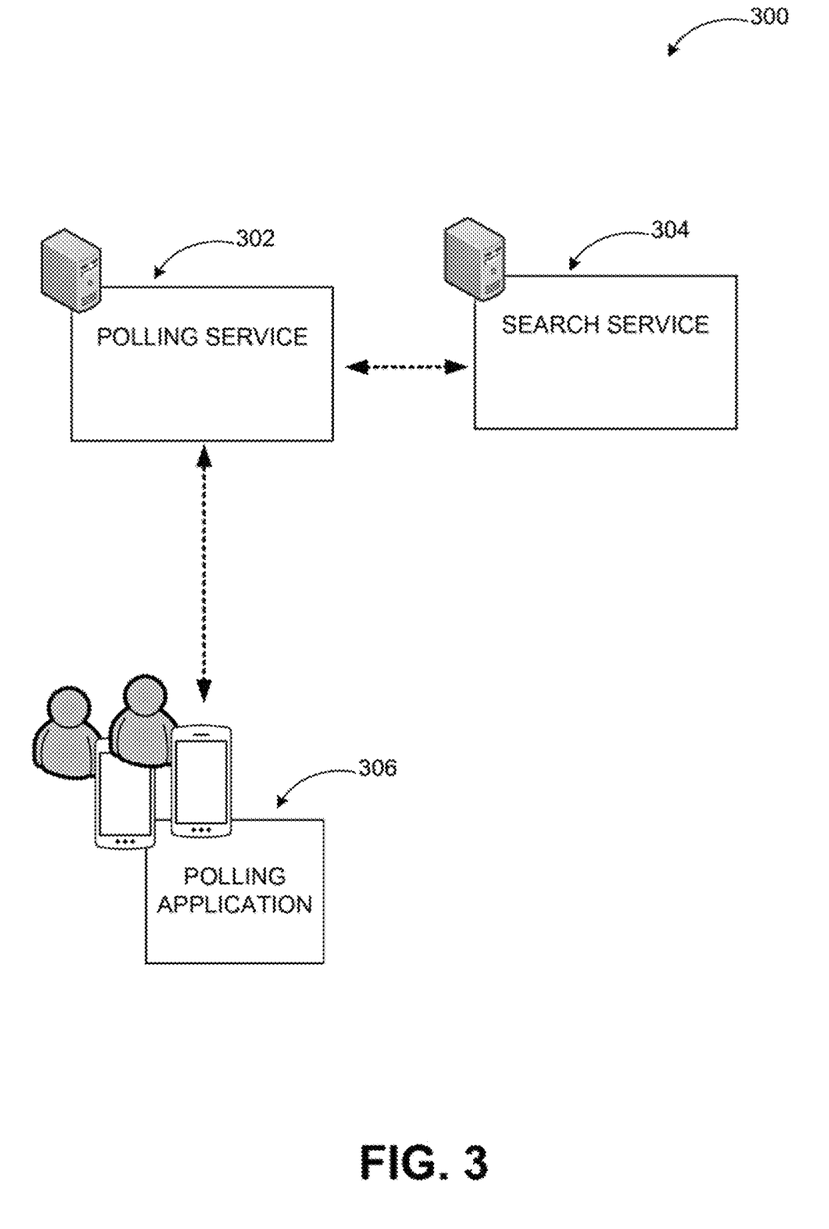
FIG. 3 illustrates an example configuration of a system for enriched polling user experience.

FIG. 3 illustrates an example configuration of a system for enriched polling user experience.

Diagram 300 shows conceptually an example configuration, where a polling service 302 may conduct a poll and present results to (and receive input from) users through a polling application 306, which may be a thin client or a thick client as discussed previously. The poll results may be displayed real time or in a discrete manner (e.g., updated based on a predefined period). The polling service 302 may submit search queries associated with a current top choice to a search service 304. Search results may be analyzed and information to be displayed in order to enrich the poll results may be selected/derived at the polling service 302.

The polling service 302 may determine when to display the enriching information based on a polling threshold. For example, upon expiration of a period as the poll is ongoing, upon receipt of a predefined number of votes, or upon reaching of a predefined ratio of votes to a total polled population may provide the threshold. The threshold may be used to gauge confidence for a stable top choice as the top choice may change frequently at the early stages of the poll.

As the poll is being conducted, as second (and others) threshold may be used to revise the enriching information if the top choice changes. For example, the top choice may be checked after expiration of another predefined period, receipt of another predefined number of votes, etc. Alternatively, the top choice may be monitored continuously and whenever it changes, new search query may be submitted to the search service and results analyzed for updating the enriching information.

Figure 4:
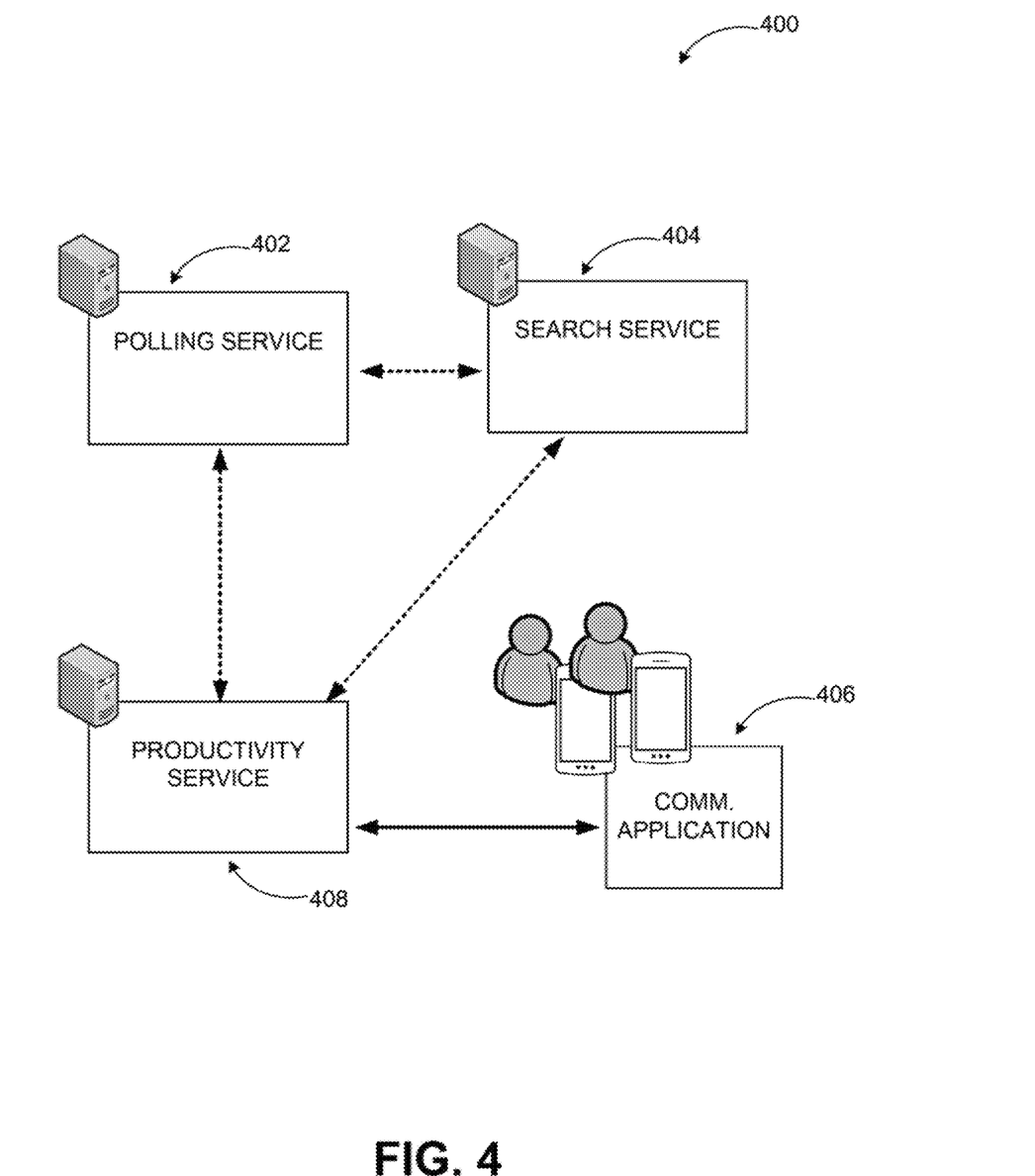
FIG. 4 illustrates another example configuration of a system for enriched polling user experience.

FIG. 4 illustrates another example configuration of a system for enriched polling user experience.

Diagram 400 shows conceptually an alternative configuration according to some embodiments. In the example configuration, a polling service 402 may conduct polls for a productivity service 408, that is, polls may be initiated from one or more applications within the productivity service 408, but conducted by the polling service 402. The polling service 402 may utilize the search service 404 and/or internal search engine(s) of the productivity service 408 to submit search queries to. The productivity service 408 may provide user experiences associated with the ongoing polls to users through a productivity application 406.

The productivity service 408 may be accessed by users through thick of thin clients such as the productivity application 406. The productivity application 406 may include a word processing application, a spreadsheet application, a presentation application, a communication application, a calendar application, and a note taking application. In one example scenario, the productivity application 406 may be a communication application facilitating email, messaging, and other forms of communication along with calendar tasks. A user may initiate a poll through an email, and results may be displayed to all users (or select users) through the communication application. Polling service 402 may provide the enriching information to the productivity service 408 to be displayed to the users through the user experience of the communication application.

The enriching information may include images, graphics, textual data, maps, links to resources associated with the top choice, and other useful information. Some items used to augment the poll results may be interactive. For example, an image associated with a top choice of a travel location poll may be displayed as the poll is ongoing. If a user clicks or taps on the image, useful travel information such as summary statistics, weather information, accommodation information, etc. may be displayed. In other examples, links to travel reservation sites, private or government resources, etc. may also be provided.

In some embodiments, the number of items to be displayed as enriching information and/or types of items to be displayed (e.g., image, text, graphics, links, etc.) may be selected based on the type of poll. For example, if the poll is about travel destination, an image and links may be used. If the poll is about a meeting time/location, scheduling information (free/busy times) and maps may be displayed. The type and number of items to be used as enriching information may also be selected based on vote distribution. For example, if there are more than one candidates with close votes additional information may be displayed compared to a poll where one candidate is far ahead of others.

Search(es) associated with a current top choice may be performed on local and/or remote sources. Thus, information stored locally on user computers, on servers of the underlying service (e.g., the productivity service), Internet searches, etc. may be combined to enhance accuracy and usefulness of the search results and derived enriching information.

Figure 5:
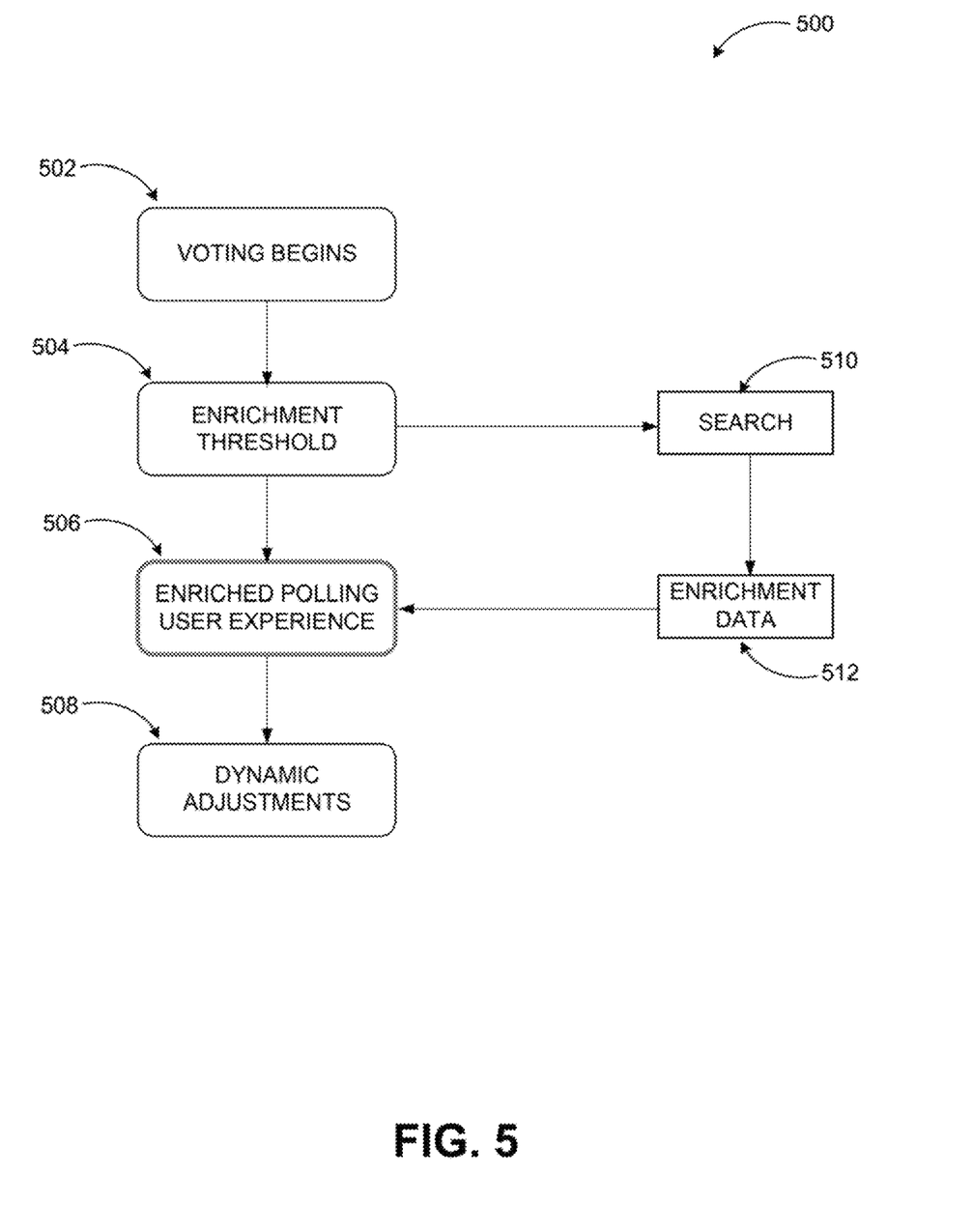
FIG. 5 illustrates example stages in providing enriched polling user experience.

FIG. 5 illustrates example stages in providing enriched polling user experience.

As shown in diagram 500, initiation of the voting 502 may trigger a monitoring process for the top choice. As the top choice may change frequently at the early stages of polling, the enrichment process may be delayed until a threshold is reached 504. Upon determining a relatively stable top choice is present, a search 510 may be performed and results may be used to derive enrichment data 512 based on type of poll, vote distribution, user or administrator selections/preferences. The enrichment data 512 may be provided to an underlying service or application to augment displayed pol results as an enriched polling user experience 506. Dynamic adjustments 508 based on changes to the top choice and/or updates to search results (for example, weather or traffic information associated with the top choice) may be made as the poll is ongoing.

The examples provided in FIGS. 1 through 5 are illustrated with specific systems, services, applications, modules, codes, and notifications. Embodiments are not limited to environments according to these examples. Enriched polling user experiences may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
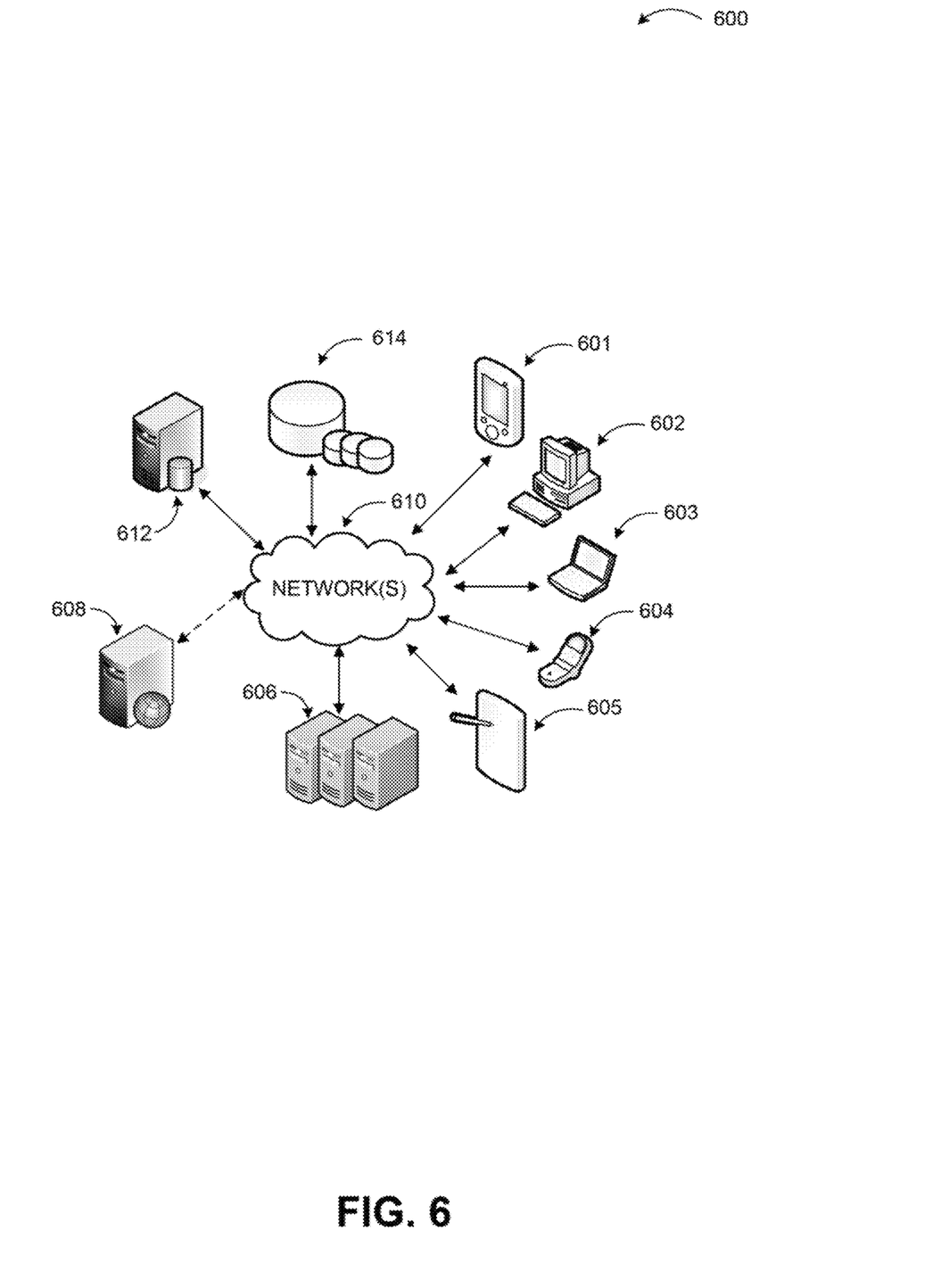
FIG. 6 is a networked environment, where a system according to embodiments may be implemented.

FIG. 6 is a networked environment, where a system according to embodiments may be implemented. In addition to locally installed applications (for example, application 106), enriched polling user experience may also be employed in conjunction with hosted applications and services (for example, a communication service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as polling data, search result data, and similar may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network (s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for enriched polling user experience. Furthermore, the networked environments discussed in FIG. 6 are for illustration purposes only. Embodiments are not limited to the example applications, engines, or processes.

Figure 7:
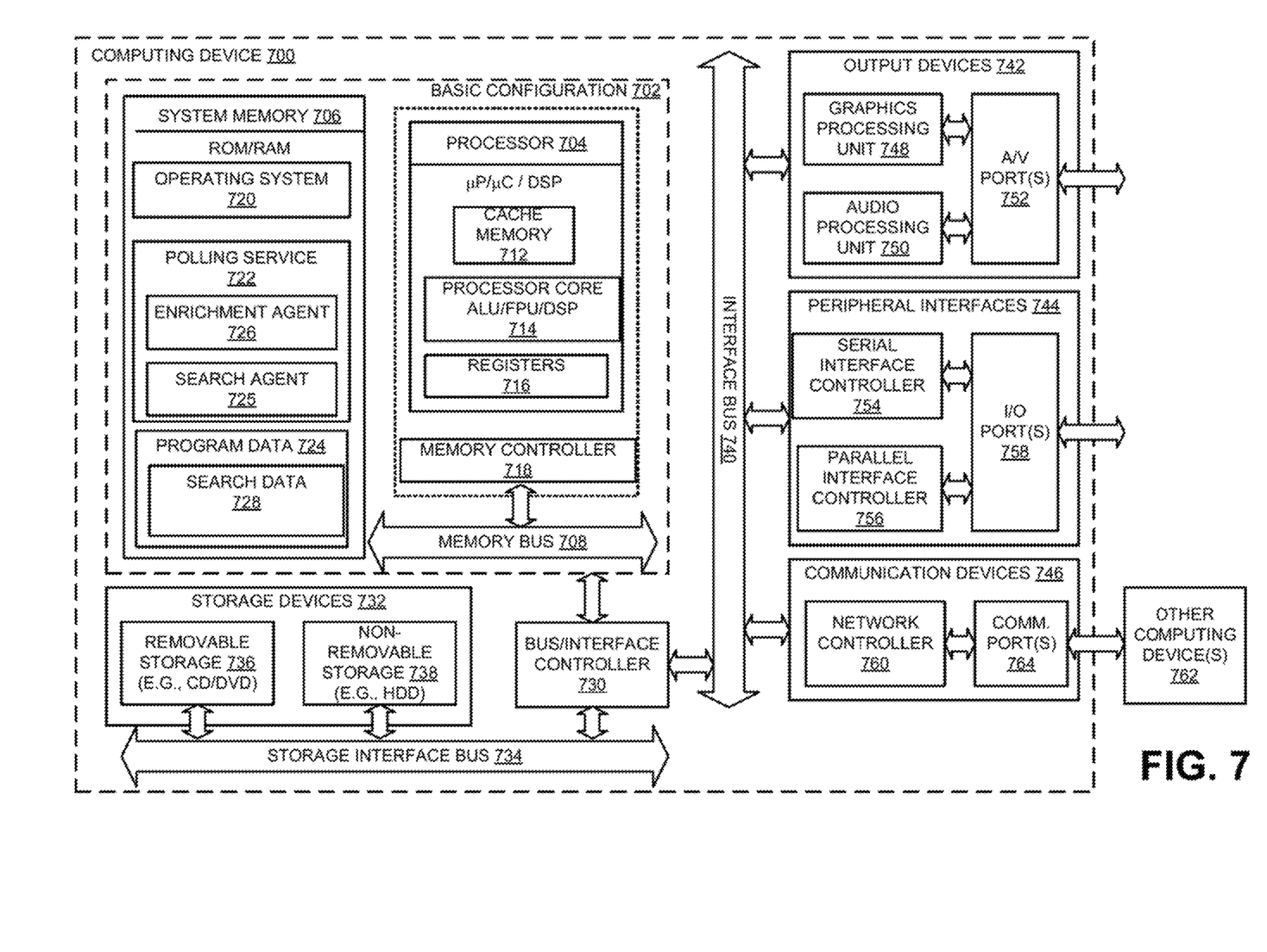
FIG. 7 is a block diagram of an example general purpose computing device, which may be used to provide enriched polling user experience.

FIG. 7 is a block diagram of an example general purpose computing device, which may be used to provide enriched polling user experience.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a polling service 722, an enrichment agent 726, a search agent 725, and program data 724. The enrichment agent 726 may determine a current top choice in an ongoing poll and submit a query to the scheduling agent 725 for executing a search on the current top choice. The enrichment agent 726 may then augment a display of the poll results with useful information in various forms associated with the current top choice. The program data 724 may include, among other data, search data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide enriched polling user experience. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
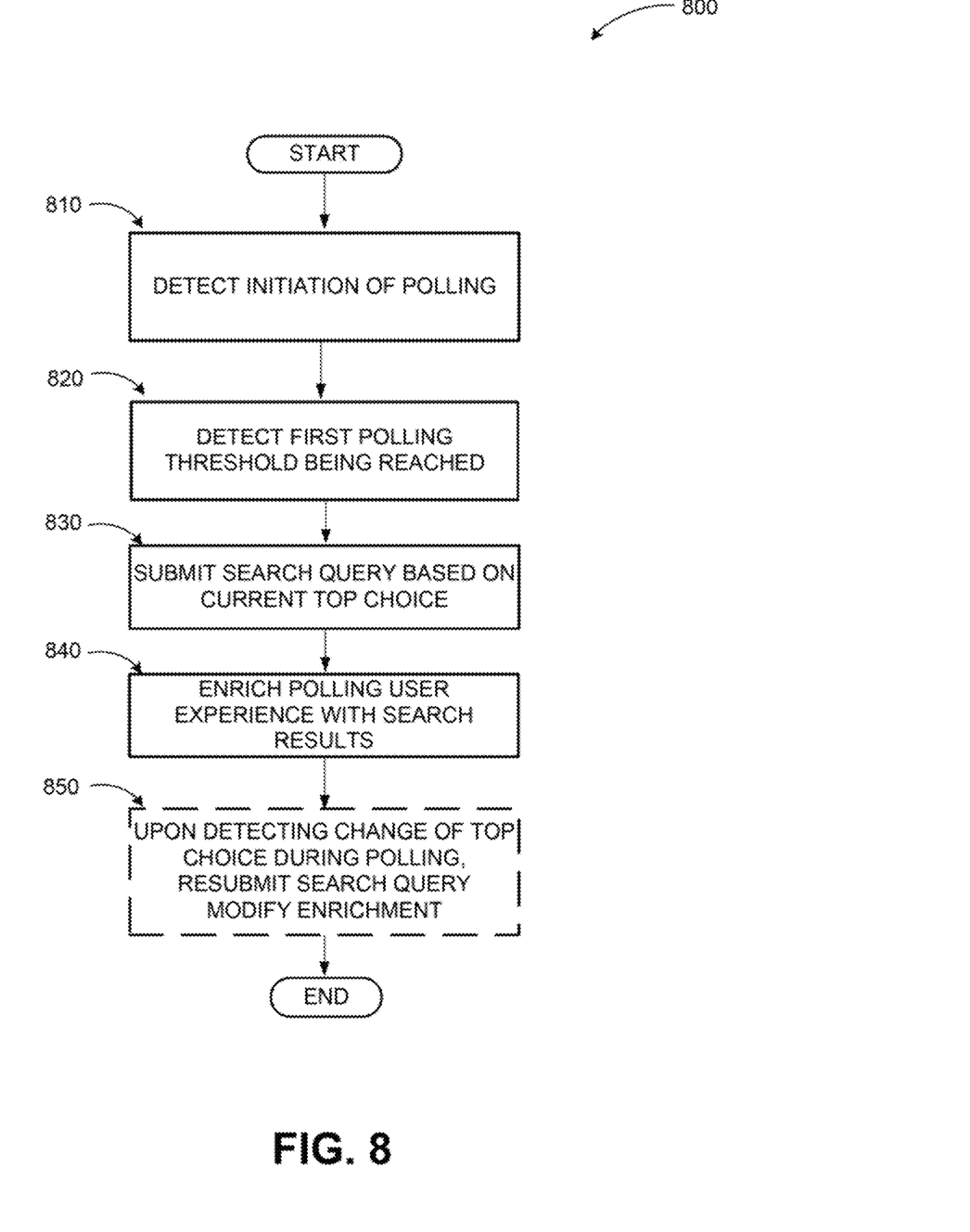
FIG. 8 illustrates a logic flow diagram of a method to provide enriched polling user experience.

FIG. 8 illustrates a logic flow diagram of a method to provide enriched polling user experience.

Process 800 may be implemented on a computing device, server, or other system. An example system may include a computer communicatively coupled to a cloud server hosting a polling service.

Process 800 begins with operation 810, where a poll may be detected. In an example scenario, the poll may be performed by a polling service in conjunction with another application and results of the poll may be provided through a user interface of the application requesting the poll. At operation 820, reaching of a polling threshold may be detected. The polling threshold may be a time duration (for example, one hour in a poll that is limited to 6 hours), a number of votes received, or a percentage of votes to a population that is being polled. The threshold may be used as a confidence gauge for the top choice of the poll, as the top choice may change quite frequently early in the poll (timewise or vote count-wise).

At operation 830, a search query may be submitted to a search engine or service based on the current top choice. The query may be customized based on a type of poll, information that is desired to be displayed in conjunction with the top choice, etc. For example, in some implementations, the search may be limited to images or maps. Yet, in other implementations, textual data or links to information resources for the top choice may also be included in the query.

At operation 840, the polling user interface displaying current poll results may be enriched with information derived from the search query results. For example, images, maps, summary information, links to useful resources, etc. may be displayed along with the results of the poll in conjunction with the current top choice.

At optional operation 850, a change in the top choice may be detected and displayed enrichment information may be updated by submitting another search query and deriving information to be displayed form results of the resubmitted query.

The operations included in process 800 are for illustration purposes Enriched polling user experience may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing enriched polling user experience is described. The means may include a means for detecting an initiation of a poll; a means for submitting a search query based on a current top choice in the poll upon detecting a polling threshold being reached; a means for receiving results of the search query; and a means for enriching a user experience that displays the poll with data derived from the received results of the search query.

According to some examples, a method to provide enriched polling user experience is described. The method may include detecting an initiation of a poll; upon detecting a polling threshold being reached, submitting a search query based on a current top choice in the poll; receiving results of the search query; and enriching a user experience that displays the poll with data derived from the received results of the search query.

According to other examples, enriching the user experience that displays the poll with the data derived from the received results of the search query may include displaying one or more images associated with the current top choice in the poll; displaying textual information associated with the current top choice in the poll; and/or displaying one or more actionable items associated with the current top choice in the poll. The actionable items may include one or more of an interactive map, a link to an information resource, and a link to a travel resource associated with the current top choice of the poll.

According to further examples, the method may also include selecting one or more items to be displayed on the user experience in association with the current top choice of the poll based on a type of the poll; upon detecting a change of the current top choice of the poll, resubmitting the search query based on a new top choice of the poll; and/or receiving results of the resubmitted search query, and enriching the user experience that displays the poll with data derived from the received results of the resubmitted search query. The polling threshold may include a predefined time period, a number of votes received in the poll, a ratio of votes received in the poll to a total population in the poll, or a number of changes of a top choice in the poll.

According to other examples, a computing device to provide enriched polling user experience is described. The computing device may include a communication interface configured to facilitate communication between the computing device and one or more servers; a memory configured to store instructions; and one or more processors coupled to the memory, where the one or more processors, in conjunction with the instructions stored in the memory, are configured to execute components of a service. The components of the service may include an application configured to provide specific functionality; and a polling agent configured to detect an initiation of a poll; upon detecting a polling threshold being reached, submit a search query based on a current top choice in the poll; receive results of the search query; enrich a user experience that displays the poll with data derived from the received results of the search query; upon detecting a change of the current top choice of the poll, resubmit the search query based on a new top choice of the poll; receive results of the resubmitted search query; and enrich the user experience that displays the poll with data derived from the received results of the resubmitted search query.

According to some examples, the service may further include a search engine configured to perform searches based on the submitted and resubmitted queries and return the results to the polling agent. The application may be a communication application and the polling agent may be an integrated component of the communication application. The service may be a productivity service and the polling agent may be configured to provide polling services to one or more applications within the productivity service, the one or more applications including a word processing application, a spreadsheet application, a presentation application, a communication application, a calendar application, and a note taking application. The polling agent may be configured to enrich the user experience that displays the poll with the data derived from the received results of the submitted and the resubmitted search queries by displaying one or more actionable items, and wherein the search queries are executed on one or more of local data sources and remote data sources.

According to further examples, a system to provide enriched polling user experience is described. The system may include a first server configured to execute a productivity service; a second server configured to execute a search service; and a third server configured to execute a polling service, where the polling service may be configured to detect an initiation of a poll by one of a plurality of applications within the productivity service; upon detecting a first polling threshold being reached, submit a search query based on a current top choice in the poll to the search service; receive results of the search query from the search service; provide data derived from the received results of the search query to the application performing the poll to enrich a user experience that displays the poll; upon detecting a change of the current top choice of the poll, resubmit the search query based on a new top choice of the poll to the search service; receive results of the resubmitted search query from the search service; and provide data derived from the received results of the resubmitted search query to the application performing the poll to enrich the user experience that displays the poll based on the new top choice of the poll.

According to some examples, the user experience that displays the poll may be enriched by displaying one or more items, the one or more items including an image, textual data, a map, or an interactive element associated with the current top choice or the new top choice. A type and a number of the one or more items may be selected based on a type of the poll. A type and a number of the one or more items may be selected based on a vote distribution in the poll. The change of the current top choice in the poll may be detected upon reaching of a second polling threshold. The first polling threshold and the second polling threshold may include a predefined time period, a number of votes received in the poll, or a ratio of votes received in the poll to a total population in the poll.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide a polling user interface, the method comprising:
   detecting, with a computer server, an initiation of a multi-user poll including a plurality of choices, each of the plurality of choices having a vote total;
   upon detecting a polling threshold being reached, transmitting, via a communication network and to a search engine, a first search query executing a search on a current top choice in the poll, wherein the current top choice is the choice having the highest vote total of the plurality of choices when the polling threshold is reached, wherein the polling threshold is one of a predefined time period, a predefined number of votes received in the poll, a ratio of votes received in the poll to a total population in the poll, and a number of changes of a top choice in the poll;
   receiving, from the search engine and via the communication network, results of the first search query; and
   generating a user interface that displays the poll with data derived from the received results of the first search query; and
   enabling the display of the user interface on a computing device.

2. The method of claim 1, wherein generating the user interface that displays the poll with the data derived from the received results of the search query comprises:
   displaying one or more images associated with the current top choice in the poll.

3. The method of claim 1, wherein generating the user interface that displays the poll with the data derived from the received results of the search query comprises:
   displaying textual information associated with the current top choice in the poll.

4. The method of claim 1, wherein generating the user interface that displays the poll with the data derived from the received results of the search query comprises:
   displaying one or more actionable items associated with the current top choice in the poll.

5. The method of claim 4, wherein the actionable items include at least one selected from the group consisting of an interactive map, a link to an information resource, and a link to a travel resource associated with the current top choice of the poll.

6. The method of claim 1, further comprising:
   selecting one or more item to be displayed on the user interface in association with the current top choice of the poll based on a type of the poll.

7. The method of claim 1, further comprising:
   upon detecting a change of the current top choice of the poll to a new top choice of the poll, transmitting, via the communication network and to the search engine, a second search query based on the new top choice of the poll.

8. The method of claim 7, further comprising:
   receiving results of the resubmitted search query; and
   generating the user interface that displays the poll with data derived from the received results of the resubmitted search query.

9. A non-transitory computer-readable medium including instructions executable by one or more electronic processors to perform a set of functions, the set of functions comprising:
   detecting an initiation of a multi-user poll including a plurality of choices, each of the plurality of choices having a vote total;
   upon detecting a polling threshold being reached, transmitting, via a communication network and to a search engine, a first search query executing a search on a current top choice in the poll, wherein the current top choice is the choice having the highest vote total of the plurality of choices when the polling threshold is reached, wherein the polling threshold is one of a predefined time period, a predefined number of votes received in the poll, a ratio of votes received in the poll to a total population in the poll, and a number of changes of a top choice in the poll;
   receiving, from the search engine and via the communication network, results of the first search query; and
   generating a user interface that displays the poll with data derived from the received results of the first search query; and
   enabling the display of the user interface on a computing device.

10. The non-transitory computer-readable medium of claim 9, wherein generating the user interface that displays the poll with the data derived from the received results of the search query comprises at least one selected from the group consisting of displaying one or more images associated with the current top choice in the poll, displaying textual information associated with the current top choice in the poll, and displaying one or more actionable items associated with the current top choice in the poll.

11. The non-transitory computer-readable medium of claim 10, wherein the actionable items include at least one selected from the group consisting of an interactive map, a link to an information resource, and a link to a travel resource associated with the current top choice of the poll.

12. The non-transitory computer-readable medium of claim 9, the set of instructions further comprising:
selecting one or more item to be displayed on the user interface in association with the current top choice of the poll based on a type of the poll.

13. The non-transitory computer-readable medium of claim 9, the set of instructions further comprising:
upon detecting a change of the current top choice of the poll to a new top choice of the poll, transmitting, via the communication network and to the search engine, a second search query based on the new top choice of the poll.

14. The non-transitory computer-readable medium of claim 13, the set of instructions further comprising:
generating the user interface that displays the poll with data derived from the received results of the resubmitted search query.

15. A computing device to provide a polling user interface, the computing device comprising:
a communication interface;
a memory configured to store instructions; and
one or more processors coupled to the memory and the communication interface, wherein the one or more processors, in conjunction with the instructions stored in the memory, are configured to:
detect an initiation of a multi-user poll including a plurality of choices, each of the plurality of choices having a vote total;
upon detecting a polling threshold being reached, transmit, via the communication interface and to a search engine, a first search query executing a search on a current top choice in the poll, wherein the current top choice is the choice having the highest vote total of the plurality of choices when the polling threshold is reached, wherein the polling threshold is one of a predefined time period, a predefined number of votes received in the poll, a ratio of votes received in the poll to a total population in the poll, and a number of changes of a top choice in the poll;
receive, from the search engine and via the communication interface, results of the first search query; and
generate a user interface that displays the poll with data derived from the received results of the first search query; and
enable the display of the user interface.

16. The computing device of claim 15, wherein generating the user interface that displays the poll with the data derived from the received results of the search query comprises at least one selected from the group consisting of displaying one or more images associated with the current top choice in the poll, displaying textual information associated with the current top choice in the poll, and displaying one or more actionable items associated with the current top choice in the poll.

17. The computing device of claim 16, wherein the actionable items include at least one selected from the group consisting of an interactive map, a link to an information resource, and a link to a travel resource associated with the current top choice of the poll.

18. The computing device of claim 15, wherein the one or more processors, in conjunction with the instructions stored in the memory, are further configured to:
select one or more item to be displayed on the user interface in association with the current top choice of the poll based on a type of the poll.

19. The computing device of claim 15, wherein the one or more processors, in conjunction with the instructions stored in the memory, are further configured to:
upon detecting a change of the current top choice of the poll to a new top choice of the poll, transmit, via the communication interface and to the search engine, a second search query based on the new top choice of the poll.

20. The computing device of claim 19, wherein the one or more processors, in conjunction with the instructions stored in the memory, are further configured to:
generate the user interface that displays the poll with data derived from the received results of the resubmitted search query.

* * * * *